(12) United States Patent
Sagane et al.

(10) Patent No.: US 11,812,350 B2
(45) Date of Patent: Nov. 7, 2023

(54) VEHICLE COMMUNICATION DEVICE AND VEHICLE COMMUNICATION SYSTEM

(71) Applicant: Yazaki Corporation, Tokyo (JP)

(72) Inventors: Naoki Sagane, Shizuoka (JP); Eita Itou, Shizuoka (JP); Ryohei Nishizaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 104 days.

(21) Appl. No.: 17/211,768

(22) Filed: Mar. 24, 2021

(65) Prior Publication Data

US 2021/0306827 A1 Sep. 30, 2021

(30) Foreign Application Priority Data

Mar. 27, 2020 (JP) .................. 2020-057305

(51) Int. Cl.
*H04W 4/40* (2018.01)
*H04W 64/00* (2009.01)
*H04W 4/46* (2018.01)
*H04W 4/02* (2018.01)
*H04W 4/44* (2018.01)

(52) U.S. Cl.
CPC ............. *H04W 4/46* (2018.02); *H04W 4/025* (2013.01); *H04W 4/44* (2018.02); *H04W 64/006* (2013.01)

(58) Field of Classification Search
USPC ....................................................... 370/331
See application file for complete search history.

(56) References Cited

U.S. PATENT DOCUMENTS

| 2005/0260996 | A1* | 11/2005 | Groenendaal | H04M 1/67 455/445 |
| 2011/0012756 | A1* | 1/2011 | Yamamoto | H04W 4/04 340/988 |
| 2013/0272269 | A1 | 10/2013 | Srivastava et al. | |
| 2014/0297091 | A1* | 10/2014 | Itoi | E02F 9/267 701/24 |

(Continued)

FOREIGN PATENT DOCUMENTS

JP 6479652 B2 3/2019

*Primary Examiner* — Gregory B Sefcheck
*Assistant Examiner* — Majid Esmaeilian
(74) *Attorney, Agent, or Firm* — KENEALY VAIDYA LLP

(57) ABSTRACT

In a vehicle communication device, a vehicle-to-vehicle communication unit receives from an other-vehicle in real time, complementary information that includes AP information that the other-vehicle cannot receive from an access point at a traveling position of the other-vehicle, the AP information being information possessed by another other-vehicle and that cannot be directly received by the vehicle-to-vehicle communication unit. Based on the complementary information received from the other-vehicle at a specific time, a controller creates complemented own-vehicle AP integrated information in which AP information that is included in an integrated range and is different from the AP information of own-vehicle AP integrated information at the specific time, is complemented. The vehicle-to-vehicle communication unit transmits the complemented own-vehicle AP integrated information at the specific time created by the controller to the other-vehicle in vicinity in real time.

10 Claims, 5 Drawing Sheets

(56) References Cited

U.S. PATENT DOCUMENTS

| | | | |
|---|---|---|---|
| 2015/0025704 A1* | 1/2015 | Horihata | H04L 12/40039 |
| | | | 700/297 |
| 2015/0189567 A1 | 7/2015 | Srivastava et al. | |
| 2017/0135007 A1 | 5/2017 | Srivastava et al. | |
| 2018/0110073 A1* | 4/2018 | Mestanov | H04W 74/0825 |
| 2019/0174286 A1* | 6/2019 | Guo | H04W 72/02 |
| 2020/0042306 A1* | 2/2020 | Kiyama | H04L 67/34 |
| 2020/0068455 A1 | 2/2020 | Badic et al. | |
| 2020/0167307 A1* | 5/2020 | Okada | G06F 9/06 |
| 2021/0243563 A1* | 8/2021 | Files | G01S 5/0054 |

* cited by examiner

| | SSID | PASSWORD | SECURITY METHOD | FREQUENCY (ch) | POSITION INFORMATION |
|---|---|---|---|---|---|
| ACCESS POINT AP1 | ○○ | ×× | △△ | □□ | ◇◇ |
| ACCESS POINT AP2 | ○○ | ×× | △△ | □□ | ◇◇ |
| ACCESS POINT AP3 | ○○ | ×× | △△ | □□ | ◇◇ |
| ACCESS POINT AP4 | ○○ | ×× | △△ | □□ | ◇◇ |
| ACCESS POINT AP5 | ○○ | ×× | △△ | □□ | ◇◇ |
| ACCESS POINT AP6 | ○○ | ×× | △△ | □□ | ◇◇ |
| ACCESS POINT AP7 | ○○ | ×× | △△ | □□ | ◇◇ |

|  | SSID | PASSWORD | SECURITY METHOD | FREQUENCY (ch) | POSITION INFORMATION |
|---|---|---|---|---|---|
| ACCESS POINT AP5 | ○○ | ×× | △△ | □□ | ◇◇ |
| ACCESS POINT AP6 | ○○ | ×× | △△ | □□ | ◇◇ |
| ACCESS POINT AP7 | ○○ | ×× | △△ | □□ | ◇◇ |
| ACCESS POINT AP8 | ○○ | ×× | △△ | □□ | ◇◇ |

|  | SSID | PASSWORD | SECURITY METHOD | FREQUENCY (ch) | POSITION INFORMATION |
|---|---|---|---|---|---|
| ACCESS POINT AP1 | ○○ | ×× | △△ | □□ | ◇◇ |
| ACCESS POINT AP2 | ○○ | ×× | △△ | □□ | ◇◇ |
| ACCESS POINT AP3 | ○○ | ×× | △△ | □□ | ◇◇ |
| ACCESS POINT AP4 | ○○ | ×× | △△ | □□ | ◇◇ |
| ACCESS POINT AP5 | ○○ | ×× | △△ | □□ | ◇◇ |
| ACCESS POINT AP6 | ○○ | ×× | △△ | □□ | ◇◇ |
| ACCESS POINT AP8 | ○○ | ×× | △△ | □□ | ◇◇ |

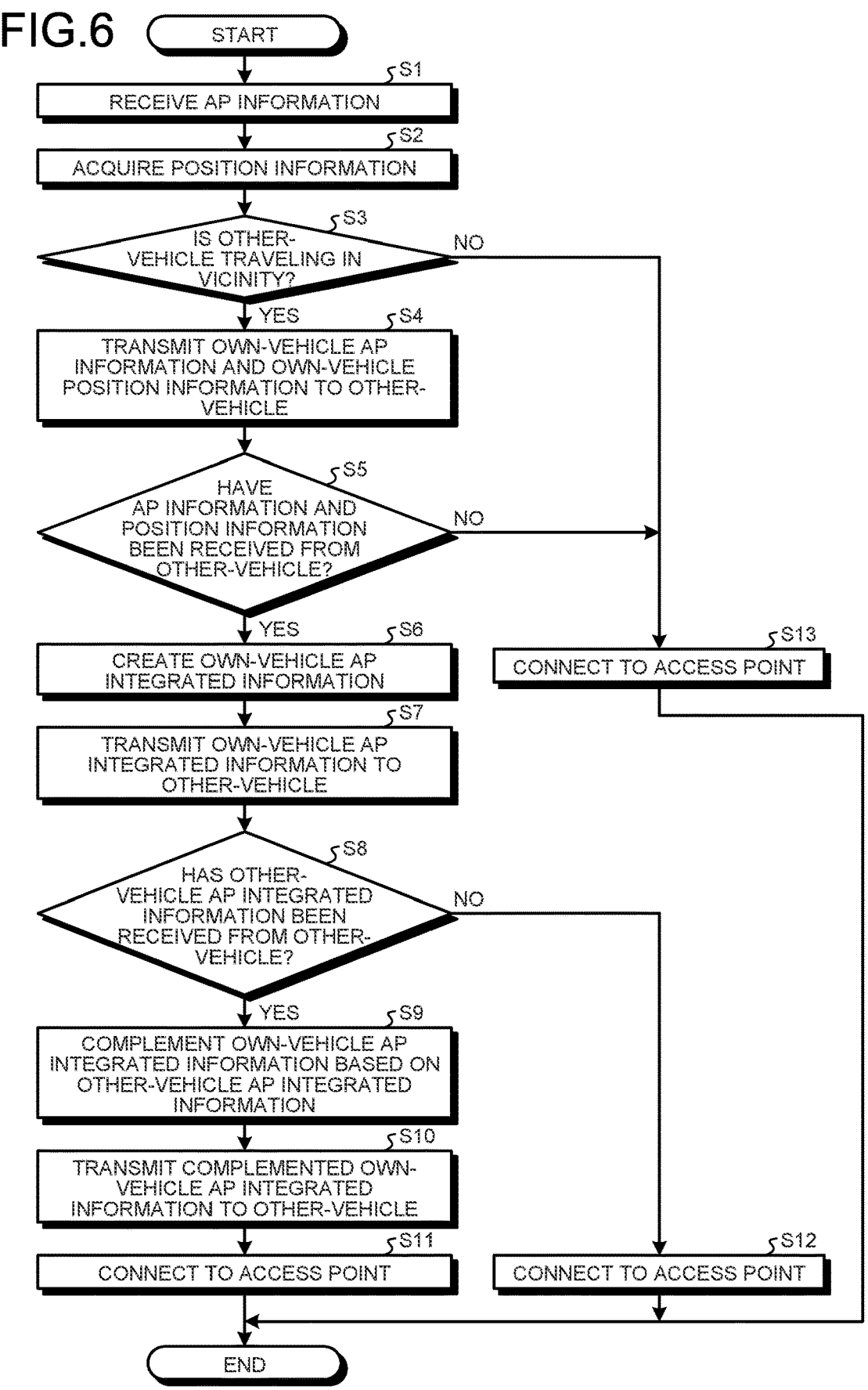

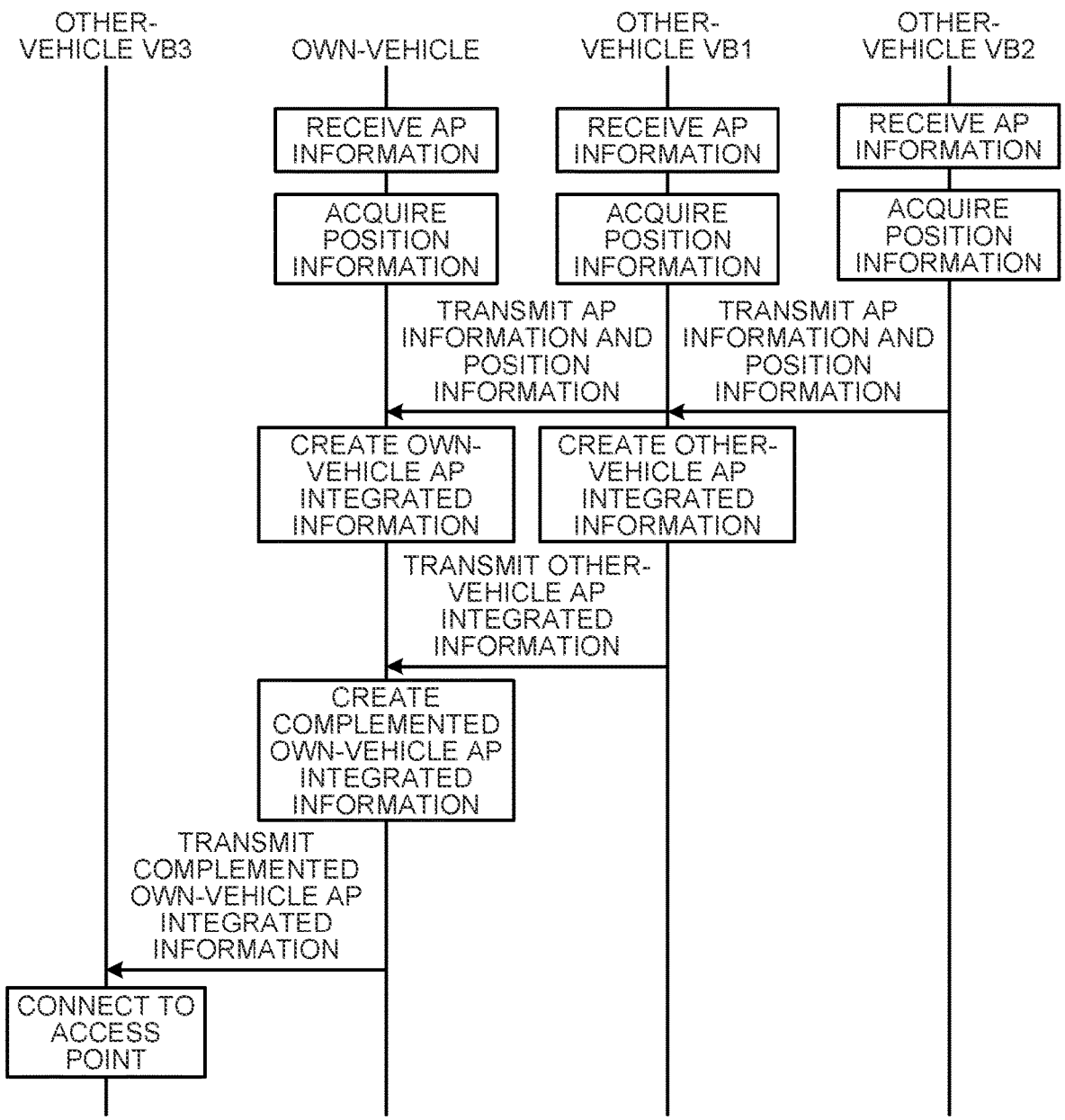

VEHICLE COMMUNICATION DEVICE AND VEHICLE COMMUNICATION SYSTEM

CROSS-REFERENCE TO RELATED APPLICATION(S)

The present application claims priority to and incorporates by reference the entire contents of Japanese Patent Application No. 2020-057305 filed in Japan on Mar. 27, 2020.

BACKGROUND OF THE INVENTION

1. Field of the Invention

The present invention relates to a vehicle communication device and a vehicle communication system.

2. Description of the Related Art

As a conventional vehicle communication device, Japanese Patent Application Laid-open No. 6479652 describes a Wi-Fi connection system including: an access point device that relays a connection to a computer network; and a customer terminal that connects to the computer network via the access point device. When the reception strength of the customer terminal is weak, the Wi-Fi connection system interrupts the connection between the customer terminal and the access point device so as to suppress the continuation of the state in which the communication quality is deteriorated.

Meanwhile, the Wi-Fi connection system described in Japanese Patent Application Laid-open No. 6479652 above has a limited connection to the access point device when connecting to the access point device based only on the access point information possessed by each of customer terminals, for example, and there is room for further improvement in this regard.

SUMMARY OF THE INVENTION

The present invention has been made in view of the above aims to provide a vehicle communication device and a vehicle communication system capable of sharing useful access point information.

In order to solve the above mentioned problem and achieve the object, a vehicle communication device according to one aspect of the present invention includes an access point communication unit that is mounted on an own-vehicle and that receives, from the access point, own-vehicle access point information needed for wirelessly connecting to a communication relay access point at a traveling position of the own-vehicle; a position information acquisition unit that acquires own-vehicle position information indicating the traveling position of the own-vehicle when the own-vehicle access point information is received by the access point communication unit; a vehicle-to-vehicle communication unit that receives, from an other-vehicle in vicinity, other-vehicle access point information needed for wirelessly connecting to a communication relay access point at a traveling position of the other-vehicle and other-vehicle position information indicating the traveling position of the other-vehicle when the other-vehicle access point information is received; and a controller that creates access point integrated information in which the own-vehicle access point information and the other-vehicle access point information are integrated with each other, wherein the vehicle-to-vehicle communication unit receives, in real time from the other-vehicle, the other-vehicle access point information regarding the access point indicating a relatively high reception strength in the other-vehicle at a specific time and the other-vehicle position information while the own-vehicle is traveling, the controller creates the access point integrated information at the specific time in which the other-vehicle access point information received in real time from the other-vehicle at the specific time, the other-vehicle position information received in real time from the other-vehicle at the specific time, the own-vehicle access point information of the access point indicating a relatively high reception strength, the own-vehicle access point information being received by the access point communication unit at the specific time, and the own-vehicle position information acquired by the position information acquisition unit at the specific time, are integrated with each other within a predetermined integrated range, the vehicle-to-vehicle communication unit further receives, in real time from the other-vehicle, complementary information that includes access point information of the access point that the other-vehicle cannot receive at the traveling position of the other-vehicle, which is the access point information of the access point that cannot be directly received by the vehicle-to-vehicle communication unit but can be received by another other-vehicle at the specific time at the traveling position of the another other-vehicle, the controller creates complemented access point integrated information in which the access point integrated information is complemented with the complementary information at the specific time received from the other-vehicle, and the vehicle-to-vehicle communication unit transmits, in real time, the complemented access point integrated information at a specific time created by the controller to the other-vehicle in vicinity.

According to another aspect of the present invention, in the vehicle communication device, it is preferable that the complemented access point integrated information includes access point information of an access point to which at least one of the own-vehicle and the other-vehicle is wirelessly connected at the specific time.

According to still another aspect of the present invention, in the vehicle communication device, it is preferable that the complemented access point integrated information transmitted to the other-vehicle is used when the other-vehicle connects to the access point.

In order to achieve the object, a vehicle communication system according to still another aspect of the present invention includes a plurality of vehicle communication devices each of which is mounted on a first vehicle, a second vehicle, and a third vehicle, wherein the vehicle communication device includes: an access point communication unit that is mounted on an own-vehicle and that receives, from the access point, own-vehicle access point information needed for wirelessly connecting to a communication relay access point at a traveling position of the own-vehicle; a position information acquisition unit that acquires own-vehicle position information indicating the traveling position of the own-vehicle when the own-vehicle access point information is received by the access point communication unit; a vehicle-to-vehicle communication unit that receives, from an other-vehicle in vicinity, other-vehicle access point information needed for wirelessly connecting to a communication relay access point at a traveling position of the other-vehicle and other-vehicle position information indicating the traveling position of the other-vehicle when the other-vehicle access point information is received; and a controller that creates access point integrated information in which the own-vehicle access point information and the other-vehicle access point information are integrated with each other, wherein the vehicle-to-vehicle communication unit receives, in real time from the other-vehicle, the other-vehicle access point information regarding the access point indicating a relatively high reception strength in the other-vehicle at a specific time and the other-vehicle position information while the own-vehicle is traveling, the controller creates the access point integrated information at the specific time in which the other-vehicle access point information received in real time from the other-vehicle at the specific time, the other-vehicle position information received in real time from the other-vehicle at the specific time, the own-vehicle access point information of the access point indicating a relatively high reception strength received by the access point communication unit at the specific time, and the own-vehicle position information acquired by the position information acquisition unit at the specific time, are integrated with each other within a predetermined integrated range, the vehicle-to-vehicle communication unit further receives, in real time from the other-vehicle, complementary information that includes access point information of the access point that the other-vehicle cannot receive at the traveling position of the other-vehicle, which is the access point information of the access point that cannot be directly received by the vehicle-to-vehicle communication unit but can be received by another other-vehicle at the specific time at the traveling position of the another other-vehicle, the controller creates complemented access point integrated information in which the access point integrated information is complemented with the complementary information at the specific time received from the other-vehicle, the vehicle-to-vehicle communication unit transmits, in real time, the complemented access point integrated information at a specific time created by the controller to the other-vehicle in vicinity, the vehicle communication device of the first vehicle, the vehicle communication device of the second vehicle, and the vehicle communication device of the third vehicle communicate with each other, and the vehicle communication device of the first vehicle creates the complemented access point integrated information in which un-complemented the access point integrated information is complemented by using the complemented access point integrated information created by the vehicle communication device of the second vehicle, as the complementary information, and transmits the complemented access point integrated information created by the vehicle communication device of the first vehicle to the vehicle communication device of the third vehicle, as the complementary information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating a configuration example of un-complemented other-vehicle AP integrated information according to an embodiment;

FIG. 5 is a diagram illustrating a configuration example of complemented own-vehicle AP integrated information according to an embodiment;

FIG. 6 is a flowchart illustrating an operation example of a vehicle communication device according to an embodiment; and FIG. 7 is a sequence chart illustrating an operation example of a vehicle communication system according to an embodiment.

DETAILED DESCRIPTION OF THE PREFERRED EMBODIMENTS

A mode (an embodiment) for carrying out the present invention will be described in detail with reference to the drawings. The present invention is not limited to the description in the following embodiments. In addition, the components described below include those that can be easily assumed by those skilled in the art and those that are substantially the same. Furthermore, the configurations described below can be combined as appropriate. In addition, various omissions, substitutions or alterations of the configuration can be made without departing from the scope and the spirit of the present invention.

Embodiment

Figure 1:
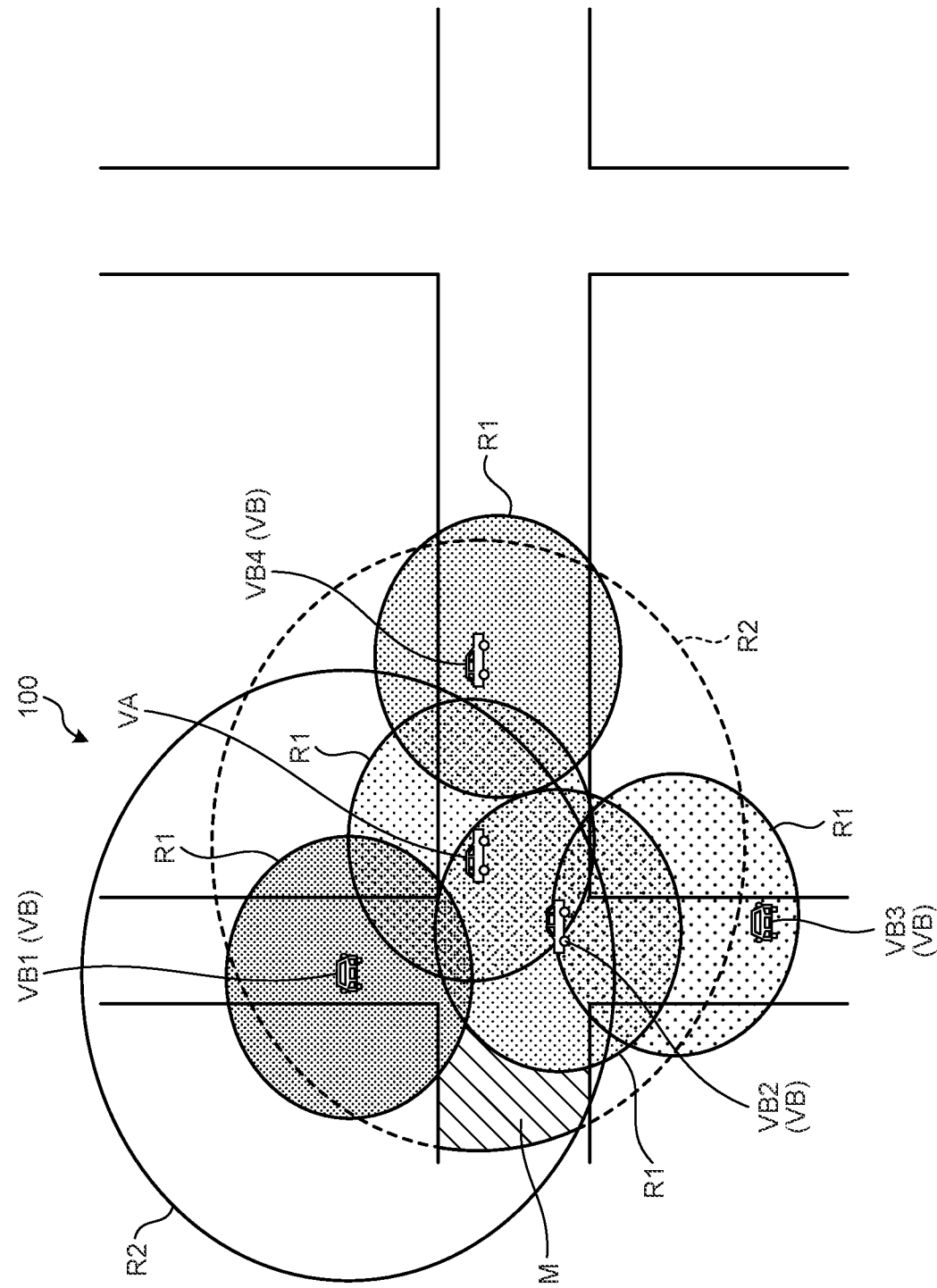
FIG. 1 is a conceptual diagram illustrating a communication example of a vehicle communication system according to an embodiment.
Figures 2, 3:
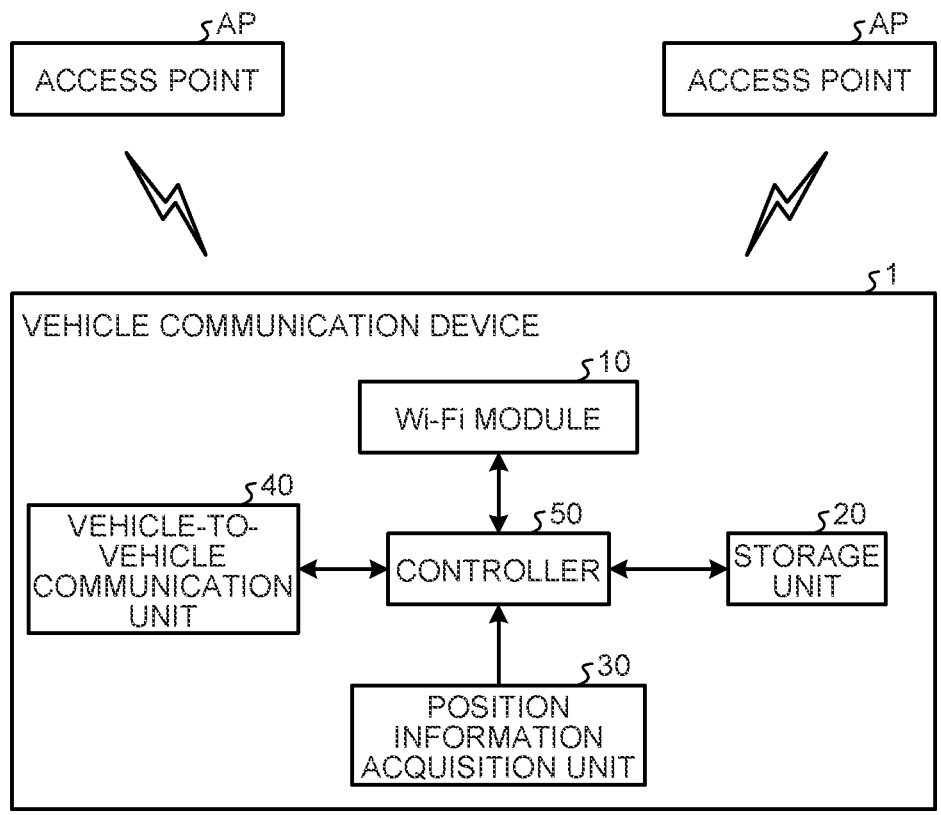
FIG. 2 is a block diagram illustrating a configuration example of a vehicle communication device according to an embodiment.
FIG. 3 is a diagram illustrating a configuration example of un-complemented own-vehicle AP integrated information according to an embodiment.

A vehicle communication system 100 according to an embodiment will be described with reference to the drawings. FIG. 1 is a conceptual diagram illustrating a communication example of the vehicle communication system 100 according to an embodiment. FIG. 2 is a block diagram illustrating a configuration example of a vehicle communication device 1 according to an embodiment. FIG. 3 is a diagram illustrating a configuration example of un-complemented own-vehicle AP integrated information N1 according to an embodiment. FIG. 4 is a diagram illustrating a configuration example of un-complemented other-vehicle AP integrated information N2 according to an embodiment. FIG. 5 is a diagram illustrating a configuration example of complemented own-vehicle AP integrated information N3 according to an embodiment.

The vehicle communication system 100 includes a plurality of vehicle communication devices 1 individually mounted on a plurality of vehicles, and is configured to connect to an access point AP based on access point information (AP information) received by vehicle-to-vehicle (V2V) communication between the individual vehicle communication devices 1. Hereinafter, the vehicle communication system 100 and the vehicle communication device 1 will be described in detail.

As illustrated in FIGS. 1 and 2, the vehicle communication system 100 includes the vehicle communication device 1 mounted on an own-vehicle VA and a plurality of the vehicle communication devices 1 individually mounted on other-vehicles VB (VB1 to VB4). The vehicle communication device 1 on the own-vehicle VA and the other-vehicles VB (first to third vehicles) transmits and receives information to and from each other by vehicle-to-vehicle communication.

The vehicle communication device 1 connects to a communication relay access point AP based on the AP information received by vehicle-to-vehicle communication between the vehicles. As illustrated in FIG. 2, the vehicle communication device 1 includes a Wireless Fidelity (Wi-Fi) module 10 as an access point communication unit, a storage unit 20, a position information acquisition unit 30, a vehicle-to-vehicle communication unit 40, and a controller 50.

The Wi-Fi (registered trademark) module 10 performs wireless communication with the access point AP. The Wi-Fi module 10 complies with a wireless Local Area Network (LAN) standard for data transmission and reception using wireless communication. The Wi-Fi module 10 can be connected to an access point AP in the wireless LAN. Here, the access point AP is a relay base for connecting to an external communication network operated by a communication service provider or the like via a wireless LAN. The access point AP communicates with the Wi-Fi module 10 within a predetermined AP communication range R1. Here, this AP communication range R1 is a range in which the access point AP can communicate with the Wi-Fi module 10. That is, the access point AP can communicate with the Wi-Fi module 10 within the AP communication range R1 and cannot communicate with the Wi-Fi module 10 outside the AP communication range R1.

The Wi-Fi module 10 receives, from the access point AP, AP information needed for wireless connection to the access point AP. Here, information such as a Service Set Identifier (SSID), a password, a security method, a frequency (ch), or the like is registered as the AP information, for example, for each of the access points AP. The SSID is an identifier used for identifying the access point AP. The password is information used for permitting the connection to the access point AP. The security method is an encryption method in the communication between the Wi-Fi module 10 and the access point AP, and examples of these include WEP, WPA, and WPA2. The frequency (ch) is a frequency used for communication between the Wi-Fi module 10 and the access point AP. As for the frequency (ch), the same frequency channel is used for communication between the Wi-Fi module 10 and the access point AP. The Wi-Fi module 10 performs authentication or the like based on the AP information and connects to the access point AP to transmit and receive information. The Wi-Fi module 10 is connected to the controller 50 and outputs a reception signal received from the access point AP to the controller 50. Further, the Wi-Fi module 10 transmits a transmission signal output from the controller 50 to the access point AP.

The storage unit 20 is non-volatile memory that stores various types of information. The storage unit 20 stores conditions, information, various programs, applications, or the like necessary for various processes in the controller 50. The storage unit 20 also stores complemented own-vehicle AP integrated information N3 (refer to FIG. 5), which will be described below. Under the control of the controller 50 or the like, such information is read out from the storage unit 20 and various types of information is written into the storage unit 20 as necessary.

The position information acquisition unit 30 acquires position information of a traveling vehicle, and an example of this is a Global Positioning System (GPS). The position information acquisition unit 30 receives a positioning signal from a satellite at predetermined intervals. Subsequently, the position information acquisition unit 30 measures the current position based on the positioning signal received from the satellite, and generates position information representing the measured current position. The position information acquisition unit 30 is connected to the controller 50 and outputs the generated position information to the controller 50 at predetermined intervals.

The vehicle-to-vehicle communication unit 40 transmits/receives information to/from a plurality of vehicles equipped with the vehicle-to-vehicle communication unit 40. The vehicle-to-vehicle communication unit 40 performs communication using radio waves in the frequency of a 700 MHz band, for example, and has a communication distance of approximately several hundred meters (for example, approximately 300 m). That is, the vehicle-to-vehicle communication unit 40 performs vehicle-to-vehicle communication within a circle range (integrated range R2) having a radius of approximately several hundred meters (for example, approximately 300 m). In other words, the own-vehicle VA performs vehicle-to-vehicle communication with other-vehicles VB located within the integrated range R2, and does not perform vehicle-to-vehicle communication with other-vehicles VB located outside the integrated range R2.

The controller 50 controls the Wi-Fi module 10, the position information acquisition unit 30, and the vehicle-to-vehicle communication unit 40. The controller 50 includes an electronic circuit mainly composed of known microcomputer including a CPU, ROM and RAM constituting memory, and an interface. The controller 50 controls the Wi-Fi module 10 and connects to an external communication network via the access point AP. The controller 50 controls the position information acquisition unit 30 and acquires position information from the position information acquisition unit 30. The controller 50 controls the vehicle-to-vehicle communication unit 40 and transmits/receives information to/from other-vehicles VB.

Next, an operation example of the vehicle communication device 1 will be described. FIG. 6 is a flowchart illustrating an operation example of the vehicle communication device 1 according to an embodiment. During the traveling of the own-vehicle VA, the vehicle communication device 1 of the own-vehicle VA receives AP information (also referred to as beacons) from the access point AP in the vicinity by the Wi-Fi module 10 (step S1). Next, the vehicle communication device 1 of the own-vehicle VA acquires the position information by the position information acquisition unit 30 (step S2). The position information acquisition unit 30 acquires the own-vehicle position information indicating a traveling position of the own-vehicle VA when the own-vehicle AP information is received by the Wi-Fi module 10, for example. That is, the own-vehicle position information represents the traveling position of the own-vehicle VA when the own-vehicle AP information is received. The own-vehicle position information and the own-vehicle AP information are associated with each other. With this configuration, the vehicle communication device 1 of the own-vehicle VA shares the own-vehicle position information and the own-vehicle AP information with the other-vehicle VB. By this information sharing, the other-vehicle VB can connect to the access point AP based on the AP information corresponding to the position information at the time of traveling through the traveling position indicated by the position information.

Next, the vehicle communication device 1 of the own-vehicle VA determines whether an other-vehicle VB is traveling in the vicinity by the controller 50 (step S3). For example, when the controller 50 has received information from an other-vehicle VB by the vehicle-to-vehicle communication unit 40, the controller 50 determines that the other-vehicle VB is traveling in the vicinity. In contrast, when the controller 50 has not received information from other-vehicles VB by the vehicle-to-vehicle communication unit 40, the controller 50 determines that no other-vehicles VB are traveling in the vicinity. When it is determined that an other-vehicle VB is traveling in the vicinity (step S3; Yes), the vehicle communication device 1 of the own-vehicle VA transmits own-vehicle AP information regarding an access point AP indicating a relatively high reception strength at a specific time, and the own-vehicle position information, to the other-vehicle VB in the vicinity by the vehicle-to-vehicle communication unit 40 (step S4). Here, the reception strength of the access point AP is determined based on a predetermined threshold, for example. For example, the controller 50 compares the reception strength of the access point AP with a threshold. The controller 50 determines that the reception strength is high when the reception strength of the access point AP is the threshold or more, and determines that the reception strength is low when the reception strength of the access point AP is less than the threshold.

Next, during the travel of the own-vehicle VA, the vehicle communication device 1 of the own-vehicle VA determines whether AP information and position information have been received from the other-vehicle VB in the vicinity by the controller 50 (step S5). For example, the controller 50 determines, in real time at a specific time, whether other-vehicle AP information needed for wirelessly connecting to the access point AP at the traveling position of each of the other-vehicles VB, and other-vehicle position information indicating the traveling position of the other-vehicle VB when the other-vehicle AP information is received, have been received from the other-vehicle VB in the vicinity. At this time, the controller 50 receives, in real time at a specific time, other-vehicle AP information indicating a relatively high reception strength and other-vehicle position information from the other-vehicle VB. Here, real time means simultaneous or immediate, and can be defined as within a predetermined time range. Having received the AP information and the position information from the other-vehicle VB by the controller 50 (step S5; Yes), the vehicle communication device 1 of the own-vehicle VA creates own-vehicle AP integrated information N1 (refer to FIG. 3) (step S6). The controller 50 creates own-vehicle AP integrated information N1 at a specific time (refer to FIG. 3) in which, for example, other-vehicle AP information received in real time from the other-vehicle VB at a specific time, other-vehicle position information received in real time from the other-vehicle VB at a specific time, own-vehicle AP information indicating relatively high reception strength received by the Wi-Fi module 10 at a specific time, and own-vehicle position information acquired by the position information acquisition unit 30 at a specific time, are integrated with each other within a predetermined integrated range R2.

Next, the vehicle communication device 1 of the own-vehicle VA transmits the own-vehicle AP integrated information N1 to the other-vehicle VB in the vicinity by the vehicle-to-vehicle communication unit 40 (step S7). Next, the vehicle communication device 1 of the own-vehicle VA determines whether the other-vehicle AP integrated information N2 has been received in real time at a specific time from the other-vehicle VB (step S8). Here, the other-vehicle AP integrated information N2 includes AP information (complementary information) that cannot be acquired in step S5 above from the other-vehicle VB in the vicinity of the own-vehicle VA. This complementary information is, for example, AP information regarding the access point AP8 included in the other-vehicle AP integrated information N2 illustrated in FIG. 4. Specifically, the complementary information (AP information regarding the access point AP8) is AP information regarding the access point AP that the other-vehicle VB in the vicinity of the own-vehicle VA cannot receive from the access point AP at the traveling position of the other-vehicle VB, which corresponds to AP information regarding the access point AP that can be received by another other-vehicle VB at the traveling position of the another other-vehicle VB at a specific time, which cannot be directly received by the vehicle-to-vehicle communication unit 40 of the own-vehicle VA. That is, this complementary information (for example, the access point AP8 in FIG. 4) is AP information that the own-vehicle VA cannot directly acquire from the other-vehicle VB in the vicinity, being the AP information that the other-vehicle VB in the vicinity has acquired from the another other-vehicle VB. The vehicle communication device 1 of the own-vehicle VA indirectly acquires, via the other-vehicle VB in the vicinity, the AP information that the other-vehicle VB in the vicinity has acquired from the another other-vehicle VB.

In the case of having received other-vehicle AP integrated information N2 at a specific time from the other-vehicle VB in real time (step S8; Yes), the vehicle communication device 1 of the own-vehicle VA uses the controller 50 to complement the own-vehicle AP integrated information N1 based on the other-vehicle AP integrated information N2 (step S9). Based on the other-vehicle AP integrated information N2 at the specific time received from the other-vehicle VB, for example, the controller 50 creates complemented own-vehicle AP integrated information N3 in which AP information regarding the access point AP8 (refer to FIG. 4), which is included in the integrated range R2 of the own-vehicle VA and is different from the AP information regarding the own-vehicle AP integrated information N1 at a specific time, is complemented. The access point AP8 of the own-vehicle AP integrated information N3 covers communication of a complementary range M in the integrated range R2 of the own-vehicle VA illustrated in FIG. 1, for example.

The complemented own-vehicle AP integrated information N3 includes own-vehicle VA information and other-vehicle AP information indicating a relatively high reception strength at a specific time. The complemented own-vehicle AP integrated information N3 includes both AP information regarding the access point AP to which at least one of the own-vehicle VA or the other-vehicle VB is wirelessly connected at a specific time, and AP information regarding the access point AP to which none of the own-vehicle VA and the other-vehicle VB are wirelessly connected at a specific time. The complemented own-vehicle AP integrated information N3 may include merely the AP information regarding the access point AP to which at least one of the own-vehicle VA or the other-vehicle VB is wirelessly connected at a specific time, without including the AP information regarding the access point AP to which none of the own-vehicle VA and the other-vehicle VB are wirelessly connected at a specific time.

Next, the vehicle communication device 1 of the own-vehicle VA transmits the complemented own-vehicle AP integrated information N3 at a specific time to the other-vehicle VB in real time by the vehicle-to-vehicle communication unit 40 (step S10). Subsequently, the vehicle communication device 1 of the own-vehicle VA connects to the access point AP based on the complemented own-vehicle AP integrated information N3 (step S11). When the own-vehicle VA travels through a traveling position indicated by position information listed in the complemented own-vehicle AP integrated information N3, for example, the vehicle communication device 1 of the own-vehicle VA connects to the access point AP based on AP information corresponding to the position information. In a case where there is a plurality of pieces of AP information corresponding to the position information, the vehicle communication device 1 of the own-vehicle VA connects to the access point AP corresponding to the AP information indicating high reception strength. In a case where there is one piece of AP information corresponding to the position information, the vehicle communication device 1 of the own-vehicle VA connects to the access point AP corresponding to the AP information.

In a case where the vehicle communication device 1 of the own-vehicle VA has not received the other-vehicle AP integrated information N2 at a specific time from the other-vehicle VB in real time in step S8 above (step S8; No), the vehicle communication device 1 connects to the access point AP based on the un-complemented own-vehicle AP integrated information N1 (step S12). In a case where there is a plurality of pieces of AP information corresponding to the position information in the own-vehicle AP integrated information N1, for example, the vehicle communication device 1 of the own-vehicle VA connects to the access point AP corresponding to the AP information indicating high reception strength. In a case where there is one piece of AP information corresponding to the position information, the vehicle communication device 1 connects to the access point AP corresponding to the AP information. In a case where the vehicle communication device 1 of the own-vehicle VA has not received the AP information or the position information from the other-vehicle VB by the controller 50 in step S5 above (step S5; No), the vehicle communication device 1 connects to the access point AP based on the AP information and position information acquired in steps S1 and S2 (step S13). In a case where the vehicle communication device 1 of the own-vehicle VA has determined that no other-vehicle VB is traveling in the vicinity in step S3 (step S3; No), the vehicle communication device 1 connects to the access point AP based on the AP information and position information acquired in steps S1 and S2 (step S13).

Next, an operation example of the vehicle communication system 100 will be described. FIG. 7 is a sequence chart illustrating an operation example of the vehicle communication system 100 according to an embodiment. Note that FIG. 7 describes main processes in order to facilitate the understanding of the explanation.

The vehicle communication system 100 includes a vehicle communication device 1 mounted on the own-vehicle VA and a plurality of vehicle communication devices 1 individually mounted on other-vehicles VB (VB1 to VB3). The vehicle communication device 1 of the own-vehicle VA and the vehicle communication device 1 of the other-vehicles VB communicate with each other, and connect to the access point AP based on the AP information received by the vehicle-to-vehicle communication between the vehicles. In the vehicle communication system 100, for example, as illustrated in FIG. 7, the other-vehicle VB2 receives AP information from an access point AP in the vicinity, and the position information acquisition unit 30 of the other-vehicle VB2 acquires the position information. Subsequently, the other-vehicle VB2 transmits the acquired AP information and the position information to the other-vehicle VB1.

The other-vehicle VB1 receives AP information from the access point AP in the vicinity and acquires position information by the position information acquisition unit 30. Subsequently, the other-vehicle VB1 transmits the acquired AP information and the position information to the own-vehicle VA. The other-vehicle VB1 creates the other-vehicle AP integrated information N2 based on the AP information and the position information acquired by oneself and the AP information and the position information transmitted from the other-vehicle VB2. Specifically, the other-vehicle VB1 creates other-vehicle AP integrated information N2 at a specific time, in which AP information received in real time from the other-vehicle VB2 at a specific time, information received in real time from the other-vehicle VB2 at a specific time, AP information indicating relatively high reception strength received by the Wi-Fi module 10 of the other-vehicle VB1 at a specific time, and position information of the other-vehicle VB1 acquired by the position information acquisition unit 30 at a specific time, are integrated with each other within a predetermined integrated range R2. The other-vehicle VB1 then transmits the created other-vehicle AP integrated information N2 to the own-vehicle VA as complementary information.

The own-vehicle VA receives AP information from an access point AP in the vicinity and acquires position information by the position information acquisition unit 30. The own-vehicle VA creates the own-vehicle AP integrated information N1 based on the AP information and the position information acquired by oneself and the AP information and the position information transmitted from the other-vehicle VB1. Specifically, the own-vehicle VA creates own-vehicle AP integrated information N1 at a specific time, in which other-vehicle AP information received in real time from the other-vehicle VB1 at a specific time, other-vehicle position information received in real time from the other-vehicle VB1 at a specific time, own-vehicle AP information regarding relatively high reception strength received by the Wi-Fi module 10 of the own-vehicle VA at a specific time, and own-vehicle position information acquired by the position information acquisition unit 30 at a specific time, are integrated with each other within the integrated range R2. Subsequently, the own-vehicle VA receives in real time the other-vehicle AP integrated information N2 at a specific time transmitted from the other-vehicle VB1 as complementary information.

Subsequently, the own-vehicle VA creates the complemented own-vehicle AP integrated information N3 in which the own-vehicle AP integrated information N1 is complemented based on the received other-vehicle AP integrated information N2. Specifically, based on the other-vehicle AP integrated information N2 at the specific time received from the other-vehicle VB1, the own-vehicle VA creates the complemented own-vehicle AP integrated information N3 in which AP information of the access point AP8, which is included in the integrated range R2 and is different from the AP information of the own-vehicle AP integrated information N1 at a specific time, is complemented. The own-vehicle VA transmits the created complemented own-vehicle AP integrated information N3 at a specific time to the other-vehicle VB3 in real time. The complemented own-vehicle AP integrated information N3 transmitted to the vehicle communication device 1 of the other-vehicle VB3 is used when the vehicle communication device 1 of the other-vehicle VB3 connects to the access point AP. The vehicle communication device 1 of the other-vehicle VB3 connects to the access point AP based on the complemented own-vehicle AP integrated information N3 transmitted from the own-vehicle VA. For example, when the other-vehicle VB3 is traveling in the traveling position represented by the position information included in the complemented own-vehicle AP integrated information N3, the vehicle communication device 1 of the other-vehicle VB3 wirelessly connects to the access point AP based on the AP information corresponding to the position information.

As described above, the vehicle communication device 1 according to an embodiment includes the Wi-Fi module 10, the position information acquisition unit 30, the vehicle-to-vehicle communication unit 40, and the controller 50. The Wi-Fi module 10 is mounted on the own-vehicle VA, and receives, from the access point AP, the own-vehicle AP information needed for wirelessly connecting to the communication relay access point AP at the traveling position of the own-vehicle VA. The position information acquisition unit 30 acquires the own-vehicle position information indicating a traveling position of the own-vehicle VA when the own-vehicle AP information is received by the Wi-Fi module 10. The vehicle-to-vehicle communication unit 40 receives, from an other-vehicle VB in the vicinity, other-vehicle AP information needed for wirelessly connecting to the communication relay access point AP at the traveling position of the other-vehicle VB, and the other-vehicle position information indicating the traveling position of the other-vehicle VB when the other-vehicle AP information is received. The controller 50 creates the own-vehicle AP integrated information N1 in which the own-vehicle AP information and the other-vehicle AP information are integrated with each other.

In the above configuration, the vehicle-to-vehicle communication unit 40 receives, in real time from the other-vehicle VB, other-vehicle AP information and other-vehicle position information regarding the access point AP indicating a relatively high reception strength in the other-vehicle VB at a specific time while the own-vehicle VA is traveling. The controller 50 creates own-vehicle AP integrated information N1 at a specific time in which other-vehicle AP information received in real time from the other-vehicle VB at a specific time, other-vehicle position information received in real time from the other-vehicle VB at a specific time, own-vehicle AP information regarding the access point AP indicating relatively high reception strength received by the Wi-Fi module 10 at a specific time, and own-vehicle position information acquired by the position information acquisition unit 30 at a specific time, are integrated with each other within a predetermined integrated range R2. The vehicle-to-vehicle communication unit 40 further receives, from the other-vehicle VB in real time, complementary information (other-vehicle AP integrated information N2) that includes access point information regarding the access point AP that the other-vehicle VB cannot receive at the traveling position of the other-vehicle VB, which is access point information regarding the access point AP that another other-vehicle VB can receive at a specific time at the traveling position of the another other-vehicle VB, which cannot be directly received by the vehicle-to-vehicle communication unit 40. The controller 50 creates the complemented own-vehicle AP integrated information N3 in which the own-vehicle AP integrated information N1 is complemented with the complementary information (other-vehicle AP integrated information N2) at a specific time received from the other-vehicle VB. The vehicle-to-vehicle communication unit 40 transmits, in real time, the complemented own-vehicle AP integrated information N3 created by the controller 50 at a specific time to the other-vehicle VB in the vicinity.

With this configuration, the vehicle communication device 1 can acquire, in real time, a larger amount of AP information than the AP information receivable by the Wi-Fi module 10 of the own-vehicle VA, together with the position information indicating the traveling position when the AP information is received, and can transmit the acquired information to the other-vehicles VB in the vicinity. The vehicle communication device 1 can transmit AP information possessed by another other-vehicle VB that cannot be directly received by the vehicle-to-vehicle communication unit 40 to the other-vehicle VB in the vicinity, and as a result, useful AP information can be shared with the other-vehicles VB in the vicinity. With this configuration, the vehicle communication device 1 of the other-vehicle VB in the vicinity connects to the access point AP at a specific traveling position based on the AP information corresponding to the specific traveling position in a wide range, making it possible to connect to the access point AP without necessity of performing the process of searching for an access point AP (for example, the process of receiving SSID). This enables the vehicle communication device 1 to reduce the connection time taken for connecting to the access point AP and to properly connect to the access point AP.

In the vehicle communication device 1, the complemented own-vehicle AP integrated information N3 includes AP information of the access point AP to which at least one of the own-vehicle VA or the other-vehicle VB is wirelessly connecting at a specific time. With this configuration, the vehicle communication device 1 can connect to the access point AP that has a connection history, making it possible to improve the connection accuracy when connecting to the access point AP.

In the vehicle communication device 1 of the own-vehicle VA, the complemented own-vehicle AP integrated information N3 transmitted to the other-vehicle VB will be used when the other-vehicle VB connects to the access point AP. With this configuration, based on the complemented own-vehicle AP integrated information N3, the vehicle communication device 1 of the other-vehicle VB can connect to the access point AP by using AP information that cannot be received by the Wi-Fi module 10 or AP information possessed by another other-vehicle VB and that cannot be directly received by the vehicle-to-vehicle communication unit 40.

Modification

A modification of an embodiment will be described. In the modification, the same components as those in the embodiment are denoted by the same reference numerals, and detailed description thereof will be omitted. The above description is an example in which the vehicle communication device 1 of the own-vehicle VA creates the complemented own-vehicle AP integrated information N3 in which the own-vehicle AP integrated information N1 is complemented based on un-complemented other-vehicle AP integrated information N2 received as complementary information from the other-vehicle VB1. However, the present invention is not limited to this example. The vehicle communication device 1 of the own-vehicle VA may create the complemented own-vehicle AP integrated information N3 in which the un-complemented own-vehicle AP integrated information N1 is complemented by using the complemented other-vehicle AP integrated information created by the vehicle communication device 1 of the other-vehicle VB1 as complementary information, for example. In addition, the vehicle communication device 1 of the own-vehicle VA may transmit the complemented own-vehicle AP integrated information N3 created by the vehicle communication device 1 of the own-vehicle VA to the vehicle communication device 1 of the other-vehicle V3 as complementary information. At this time, the vehicle communication device 1 of the other-vehicle V3 may create own complemented other-vehicle AP integrated information in which the un-complemented other-vehicle AP integrated information is complemented by using the complemented own-vehicle AP integrated information N3 created by the vehicle communication device 1 of the own-vehicle VA as complementary information, or alternatively, may wirelessly connect to the access point AP based on the complemented own-vehicle AP integrated information N3. With this configuration, the vehicle communication system 100 can share useful access point information among a plurality of vehicles.

The above description is an example in which the AP information included in the complemented own-vehicle AP integrated information N3 is AP information of the access point AP being in wireless connection with at least one of the own-vehicle VA or the other-vehicle VB. The present invention, however, is not limited to this example, and the AP information may include the AP information of the access point AP to which none of the own-vehicle VA and the other-vehicle VB are in wireless connection.

The above description is an example in which the controller 50 performs complementation of the AP information of the access point AP included in the integrated range R2. The range, however, is not limited to this integrated range R2 and may be any range as long as it is broader than the AP communication range R1 and that enables complementation of proper AP information. For example, the integrated range R2 is appropriately determined by the speed of the vehicle and the arithmetic performance of the vehicle communication device 1.

The above description is an example in which the vehicle communication device 1 acquires correction information by vehicle-to-vehicle communication (V2V). The present invention, however, is not limited to this, and it is allowable, for example, to acquire correction information by road-to-vehicle communication of a roadside unit or the like.

The above description is an example in which the vehicle communication device 1 of the own-vehicle VA performs the process of receiving AP information and position information from the other-vehicle VB (step S5) and the process of receiving the other-vehicle AP integrated information N2 from the other-vehicle VB (step S8) separately from each other. The present invention, however, is not limited to this, and it is allowable, for example, to simultaneously execute the processes of steps S5 and S8.

The above description is an example in which the vehicle-to-vehicle communication unit 40 performs communication using radio waves having a frequency in the 700 MHz band, in which the communication distance is approximately several hundred meters (for example, approximately 300 m). The present invention is not limited to this, and it is allowable to perform communication using radio waves in other frequencies.

The vehicle communication device and the vehicle communication system according to the present embodiment transmit complemented own-vehicle access point integrated information to other-vehicles in the vicinity in real time, enabling useful access point information to be shared with the vehicles.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle communication device comprising:
   an access point communication unit that is mounted on an own-vehicle and that receives, from a communication relay access point, own-vehicle access point information needed for wirelessly connecting to the communication relay access point at a traveling position of the own-vehicle, the access point information includes at least one of a service set identifier, a password, a security method, and a frequency;
   a position information acquisition unit that acquires own-vehicle position information indicating the traveling position of the own-vehicle when the own-vehicle access point information is received by the access point communication unit;
   a vehicle-to-vehicle communication unit that receives, from an other-vehicle in vicinity, other-vehicle access point information needed for wirelessly connecting to a communication relay access point at a traveling position of the other-vehicle and other-vehicle position information indicating the traveling position of the other-vehicle when the other-vehicle access point information is received; and
   a controller that creates access point integrated information in which the own-vehicle access point information and the other-vehicle access point information are integrated with each other, wherein
   the vehicle-to-vehicle communication unit receives, in real time from the other-vehicle, the other-vehicle access point information regarding the communication relay access point indicating a relatively high reception strength in the other-vehicle at a specific time and the other-vehicle position information while the own-vehicle is traveling,
   the controller creates the access point integrated information at the specific time in which the other-vehicle access point information received in real time from the other-vehicle at the specific time, the other-vehicle position information received in real time from the other-vehicle at the specific time, the own-vehicle access point information of the communication relay access point indicating a relatively high reception strength, the own-vehicle access point information being received by the access point communication unit at the specific time, and the own-vehicle position information acquired by the position information acquisition unit at the specific time, are integrated with each other within a predetermined integrated range,
   the vehicle-to-vehicle communication unit further receives, in real time from the other-vehicle, complementary information that includes access point information of the communication relay access point that the other-vehicle cannot receive at the traveling position of the other-vehicle, which is the access point information of the communication relay access point that cannot be directly received by the vehicle-to-vehicle communication unit but can be received by another other-vehicle at the specific time at the traveling position of the another other-vehicle,
   the controller creates complemented access point integrated information in which the access point integrated information is complemented with the complementary information at the specific time received from the other-vehicle, the complemented access point integrated information includes access point information about a plurality of different communication relay access points,
   the vehicle-to-vehicle communication unit transmits, in real time, the complemented access point integrated information at a specific time created by the controller to the other-vehicle in vicinity, and
   the vehicle communication device of the own-vehicle creates the complemented access point integrated information in which un-complemented access point integrated information is complemented by using the complemented access point integrated information created by the vehicle communication device of the other-vehicle, as the complementary information, and transmits the complemented access point integrated information created by the vehicle communication device of the own-vehicle to the vehicle communication device of the other-vehicle, as the complementary information.

2. The vehicle communication device according to claim 1, wherein
the complemented access point integrated information includes access point information of a communication relay access point to which at least one of the own-vehicle and the other-vehicle is wirelessly connected at the specific time.

3. The vehicle communication device according to claim 1, wherein
the complemented access point integrated information transmitted to the other-vehicle is used when the other-vehicle connects to the communication relay access point.

4. The vehicle communication device according to claim 2, wherein
the complemented access point integrated information transmitted to the other-vehicle is used when the other-vehicle connects to the communication relay access point.

5. A vehicle communication system comprising:
a plurality of vehicle communication devices, a respective one of the communication devices is mounted on a first vehicle, a second vehicle, and a third vehicle, respectively, wherein
each of the vehicle communication devices includes:
an access point communication unit that is mounted on an own-vehicle and that receives, from a communication relay access point, own-vehicle access point information needed for wirelessly connecting to the communication relay access point at a traveling position of the own-vehicle, the access point information includes at least one of a service set identifier, a password, a security method, and a frequency;
a position information acquisition unit that acquires own-vehicle position information indicating the traveling position of the own-vehicle when the own-vehicle access point information is received by the access point communication unit;
a vehicle-to-vehicle communication unit that receives, from an other-vehicle in vicinity, other-vehicle access point information needed for wirelessly connecting to a communication relay access point at a traveling position of the other-vehicle and other-vehicle position information indicating the traveling position of the other-vehicle when the other-vehicle access point information is received; and
a controller that creates access point integrated information in which the own-vehicle access point information and the other-vehicle access point information are integrated with each other, wherein
the vehicle-to-vehicle communication unit receives, in real time from the other-vehicle, the other-vehicle access point information regarding the communication relay access point indicating a relatively high reception strength in the other-vehicle at a specific time and the other-vehicle position information while the own-vehicle is traveling,
the controller creates the access point integrated information at the specific time in which the other-vehicle access point information received in real time from the other-vehicle at the specific time, the other-vehicle position information received in real time from the other-vehicle at the specific time, the own-vehicle access point information of the communication relay access point indicating a relatively high reception strength received by the access point communication unit at the specific time, and the own-vehicle position information acquired by the position information acquisition unit at the specific time, are integrated with each other within a predetermined integrated range,
the vehicle-to-vehicle communication unit further receives, in real time from the other-vehicle, complementary information that includes access point information of the communication relay access point that the other-vehicle cannot receive at the traveling position of the other-vehicle, which is the access point information of the communication relay access point that cannot be directly received by the vehicle-to-vehicle communication unit but can be received by another other-vehicle at the specific time at the traveling position of the another other-vehicle,
the controller creates complemented access point integrated information in which the access point integrated information is complemented with the complementary information at the specific time received from the other-vehicle, the complemented access point integrated information includes access point information about a plurality of different communication relay access points,
the vehicle-to-vehicle communication unit transmits, in real time, the complemented access point integrated information at a specific time created by the controller to the other-vehicle in vicinity,
the vehicle communication device of the first vehicle, the vehicle communication device of the second vehicle, and the vehicle communication device of the third vehicle communicate with each other, and
the vehicle communication device of the first vehicle creates the complemented access point integrated information in which un-complemented access point integrated information is complemented by using the complemented access point integrated information created by the vehicle communication device of the second vehicle, as the complementary information, and transmits the complemented access point integrated information created by the vehicle communication device of the first vehicle to the vehicle communication device of the third vehicle, as the complementary information.

6. The vehicle communication device according to claim 1, wherein
the complemented access point integrated information includes a second access point information to which neither the own-vehicle nor the other-vehicle are wirelessly connected to at the specific time.

7. The vehicle communication system according to claim 5, wherein
the complemented access point integrated information includes a second access point information to which neither the own-vehicle nor the other-vehicle are wirelessly connected to at the specific time.

8. The vehicle communication device according to claim 1, wherein the access point information includes the service set identifier, the password, the security method, and the frequency.

9. The vehicle communication system according to claim 5, wherein
the access point information includes the service set identifier, the password, the security method, and the frequency.

10. A vehicle communication system comprising:
a plurality of vehicle communication devices each of which is mounted on a first vehicle, a second vehicle, and a third vehicle, wherein
the vehicle communication device includes:
an access point communication unit that is mounted on an own-vehicle and that receives, from the access point, own-vehicle access point information needed for wirelessly connecting to a communication relay access point at a traveling position of the own-vehicle;
a position information acquisition unit that acquires own-vehicle position information indicating the traveling position of the own-vehicle when the own-vehicle access point information is received by the access point communication unit;
a vehicle-to-vehicle communication unit that receives, from an other-vehicle in vicinity, other-vehicle access point information needed for wirelessly connecting to a communication relay access point at a traveling position of the other-vehicle and other-vehicle position information indicating the traveling position of the other-vehicle when the other-vehicle access point information is received; and
a controller that creates access point integrated information in which the own-vehicle access point information and the other-vehicle access point information are integrated with each other, wherein
the vehicle-to-vehicle communication unit receives, in real time from the other-vehicle, the other-vehicle access point information regarding the access point indicating a relatively high reception strength in the other-vehicle at a specific time and the other-vehicle position information while the own-vehicle is traveling,
the controller creates the access point integrated information at the specific time in which the other-vehicle access point information received in real time from the other-vehicle at the specific time, the other-vehicle position information received in real time from the other-vehicle at the specific time, the own-vehicle access point information of the access point indicating a relatively high reception strength received by the access point communication unit at the specific time, and the own-vehicle position information acquired by the position information acquisition unit at the specific time, are integrated with each other within a predetermined integrated range,
the vehicle-to-vehicle communication unit further receives, in real time from the other-vehicle, complementary information that includes access point information of the access point that the other-vehicle cannot receive at the traveling position of the other-vehicle, which is the access point information of the access point that cannot be directly received by the vehicle-to-vehicle communication unit but can be received by another other-vehicle at the specific time at the traveling position of the another other-vehicle,
the controller creates complemented access point integrated information in which the access point integrated information is complemented with the complementary information at the specific time received from the other-vehicle,
the vehicle-to-vehicle communication unit transmits, in real time, the complemented access point integrated information at a specific time created by the controller to the other-vehicle in vicinity,
the vehicle communication device of the first vehicle, the vehicle communication device of the second vehicle, and the vehicle communication device of the third vehicle communicate with each other,
the vehicle communication device of the first vehicle creates the complemented access point integrated information in which un-complemented access point integrated information is complemented by using the complemented access point integrated information created by the vehicle communication device of the second vehicle, as the complementary information, and transmits the complemented access point integrated information created by the vehicle communication device of the first vehicle to the vehicle communication device of the third vehicle, as the complementary information,
the vehicle communication device of the third vehicle creates the complemented access point integrated information in which un-complemented access point integrated information is complemented by using the complemented access point integrated information transmitted by the vehicle communication device of the first vehicle, as the complementary information, and transmits the complemented access point integrated information created by the vehicle communication device of the third vehicle to the vehicle communication device of the other-vehicle, as the complementary information.

* * * * *